(12) United States Patent
Englander

(10) Patent No.: US 6,398,375 B1
(45) Date of Patent: Jun. 4, 2002

(54) VEHICULAR MIRROR

(75) Inventor: Benjamin Englander, Jamaica, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

(21) Appl. No.: 09/459,447

(22) Filed: Dec. 13, 1999

Related U.S. Application Data

(60) Provisional application No. 60/116,295, filed on Jan. 19, 1999.

(51) Int. Cl.[7] ................................................ G02B 5/10
(52) U.S. Cl. ....................................... 359/864; 359/865
(58) Field of Search ................................ 359/850, 855, 359/864, 865, 866, 868, 854

(56) References Cited

U.S. PATENT DOCUMENTS 2,279,751 A * 4/1942 Hensley ...................... 359/866
3,187,628 A * 6/1965 Canns et al. ................ 359/866
3,712,715 A * 1/1973 Wagner ...................... 359/855
5,295,021 A * 3/1994 Swanson ..................... 359/850
5,307,211 A * 4/1994 Schmidt et al. ............. 359/868

FOREIGN PATENT DOCUMENTS

GB          1602384      * 11/1981     ................. 359/865

* cited by examiner

Primary Examiner—Mark A. Robinson
(74) Attorney, Agent, or Firm—Ostrolenk, Faber, Gerb & Soffen, LLP.

(57) ABSTRACT

A mirror assembly for vehicles, preferably busses and including school busses, comprises an integrated mirror supporting unit which houses therein a pair of rear view mirrors and a single cross view mirror. The integrated mirror supporting unit is suspended from a supporting arm which extends between the vehicle and the mirror supporting unit.

19 Claims, 12 Drawing Sheets

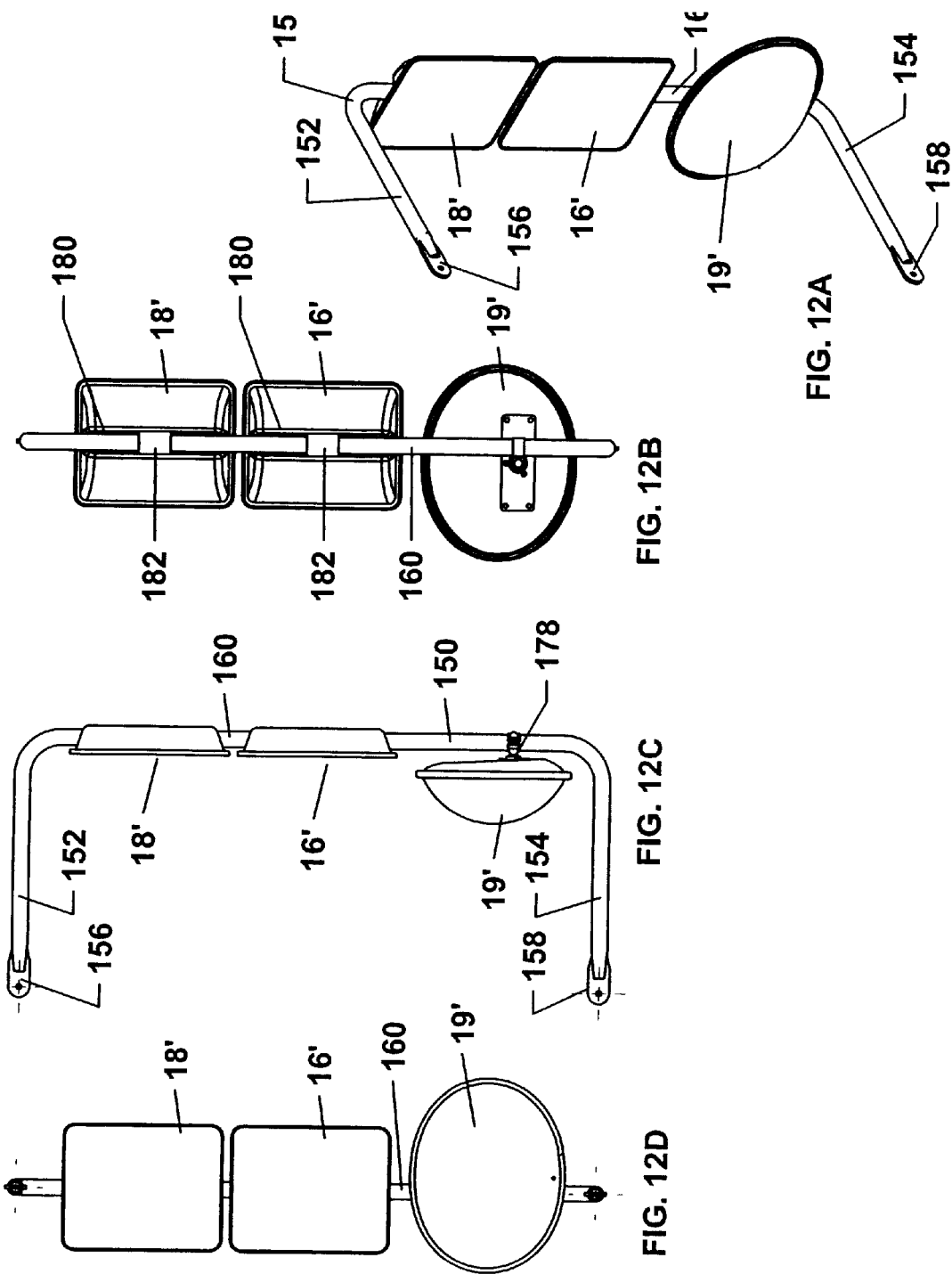

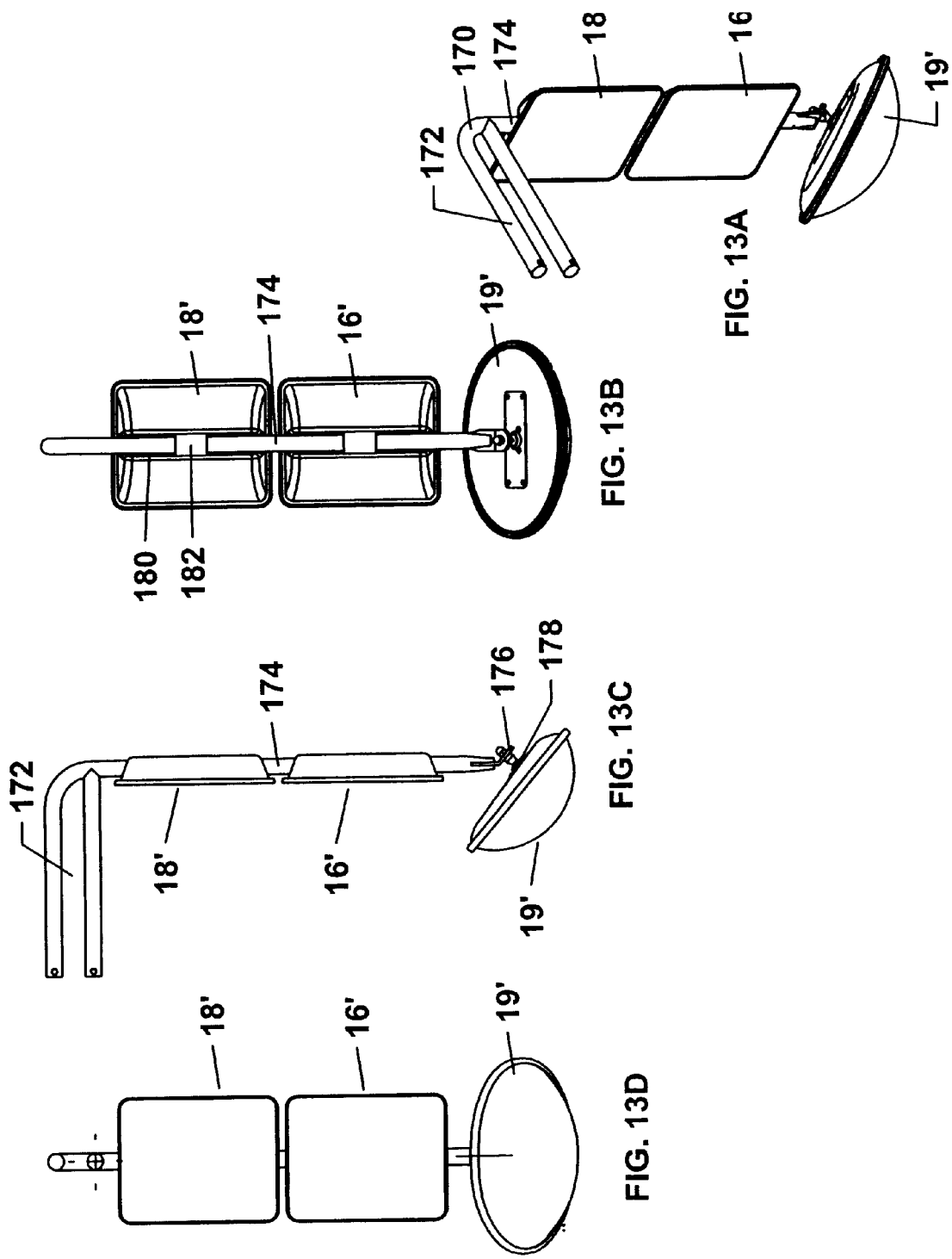

US 6,398,375 B1

VEHICULAR MIRROR

This application is based: on and entitled to the priority of Provisional Application Serial No. 60/116,295, filed Jan. 19, 1999.

BACKGROUND OF THE INVENTION

The present invention relates to vehicular mirrors for busses, including school busses, trucks, or the like and, more particularly, to busses in which both so-called "cross view" and rear view mirrors are desired.

Busses, for example, school busses, require both cross view and rear view mirror assemblies. Cross view mirror assemblies typically include elliptical convex mirrors and are typically disposed forward of a front-most portion of a bus such that the driver may view an area forward and in front of the bus. This enables the driver to see, for example, children passing in front of, or otherwise located in front of, the bus. Thus, the driver may avoid injuring the child. Cross view mirror assemblies typically employ convex mirrors.

Rear view mirror assemblies are typically disposed at a side of a school bus such that the driver may view areas alongside and rearward of the bus. Side view mirror assemblies may employ combinations of flat and convex mirrors. Such assemblies typically employ one flat mirror and one convex mirror, where the convex mirror is mounted below the flat mirror.

Typically, rear view mirror assemblies have-been provided separately, independently of and in a position spaced away from cross view mirror assemblies. Often, rear view mirror assemblies are located closer to the driver along the sides of the vehicle. In contrast, cross view assemblies are typically located more forward, in a position that facilitates supporting cross view mirrors so that they can "look" forward, in front of the vehicle. This has resulted in a more costly arrangement in that each type of mirror assembly has required its own mounting bracketry e.g. arms, support rods, mirror poles, etc. The prior art arrangement is also more likely to create greater aerodynamic resistence. A further consideration is the potential for driver confusion when there are more mirrors which are located in many different spots over the vehicle body, whereby in an emergency a driver may become temporarily confused or disoriented leading to possible serious errors in judgement.

SUMMARY OF THE INVENTION

Accordingly, it is an object of the present invention to provide a mirror assembly, particularly for school busses, which avoids the aforementioned and other drawbacks of the prior art.

It is another object of the present invention to provide an integrated mirror assembly unit which incorporates both rear view and cross view mirrors.

It is still a further object of the present invention to provide mirror assemblies for vehicles which are more aerodynamically constructed.

It is yet another object of the present invention to provide a composite assembly which supports both cross view and rear view mirrors in a more esthetically designed package that conveys an three mirrors.

Yet another object of the invention is to provide an integrated housing for holding rear view and cross-view mirrors in a manner that allows each of the mirrors to be independently adjustable, even three-dimensionally—at least in the case of the cross view mirror.

The foregoing and other objects of the invention are realized by a mirror assembly constituted of a shell housing made of one or more (preferably two) parts or sections and supporting a plurality of mirrors including a substantially flat first rear view mirror, an intermediately convex, second rear view mirror and a third, radically convex mirror serving as a cross view mirror.

The two sub-shells or sections of the shell housing are preferably connected by a pin, which allows the cross view mirror to rotate about a vertical axis, even while the other rear view mirrors remain stationary. Preferably, the shell housing sections are such that the part which supports the cross view mirror can be aligned with the part that supports the rear view mirrors and has substantially the same build and shape as viewed from the front and the sides thereof as to suggest to an observer that there is a single housing. Preferably, the entire shell housing is suspended from a single horizontally moveable arm which is pivotally connected to the vehicle.

Other features and advantages of the present invention will become apparent from the following description of the invention which refers to the accompanying drawings.

BRIEF DESCRIPTION OF THE DRAWINGS

FIGS. 12A 12B, 12C and 12D show another embodiment of a supporting structure for supporting an assembly of three separate mirrors.

FIGS. 13A, 13B, 13C and 13D depict yet another embodiment of a supporting structure for an assembly of three mirrors in accordance with the present invention.

DETAILED DESCRIPTION OF THE DRAWINGS

Figure 1:
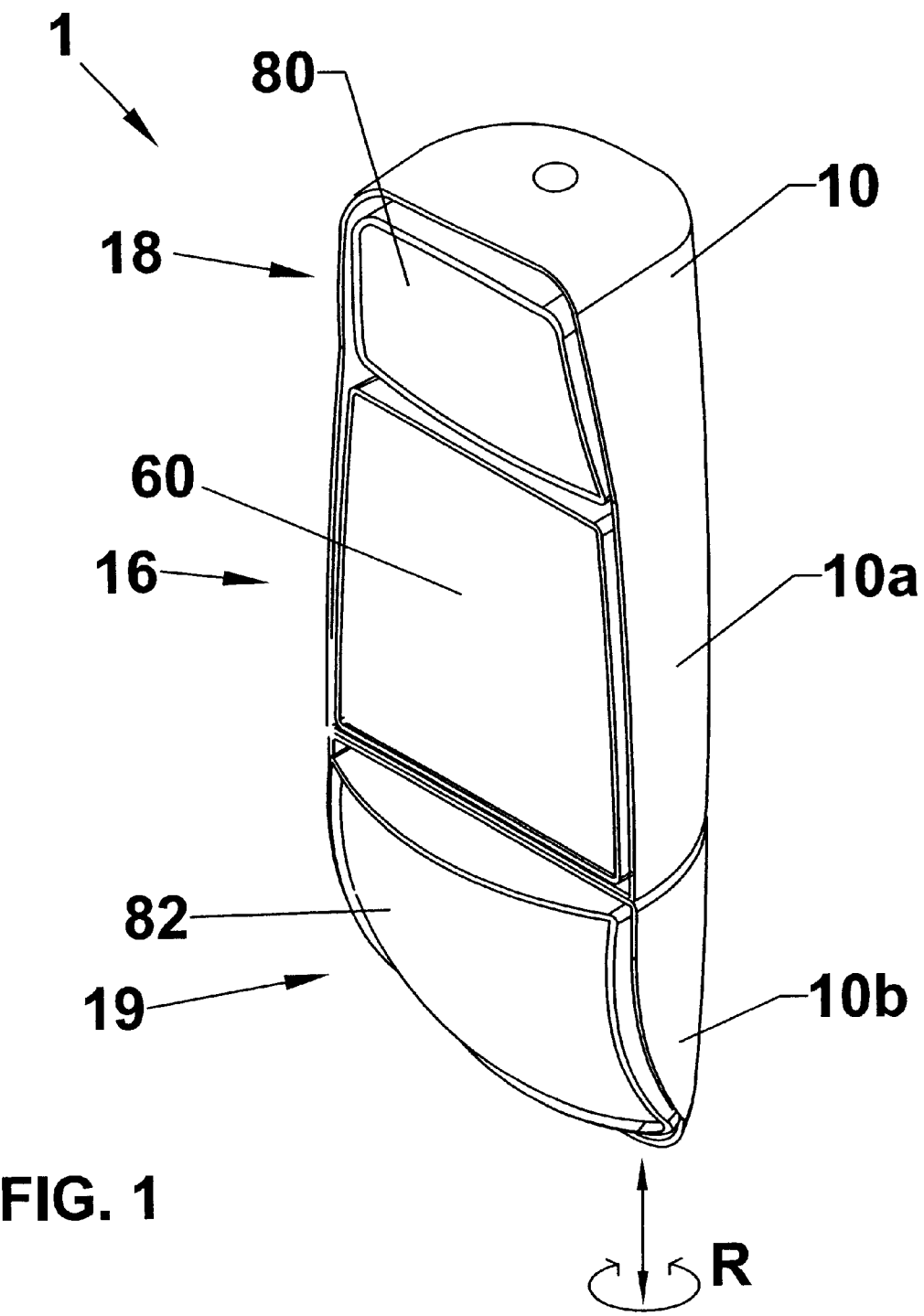
FIG. 1 is a perspective of the composite rear/cross view mirror assembly of the present invention.
Figure 7:
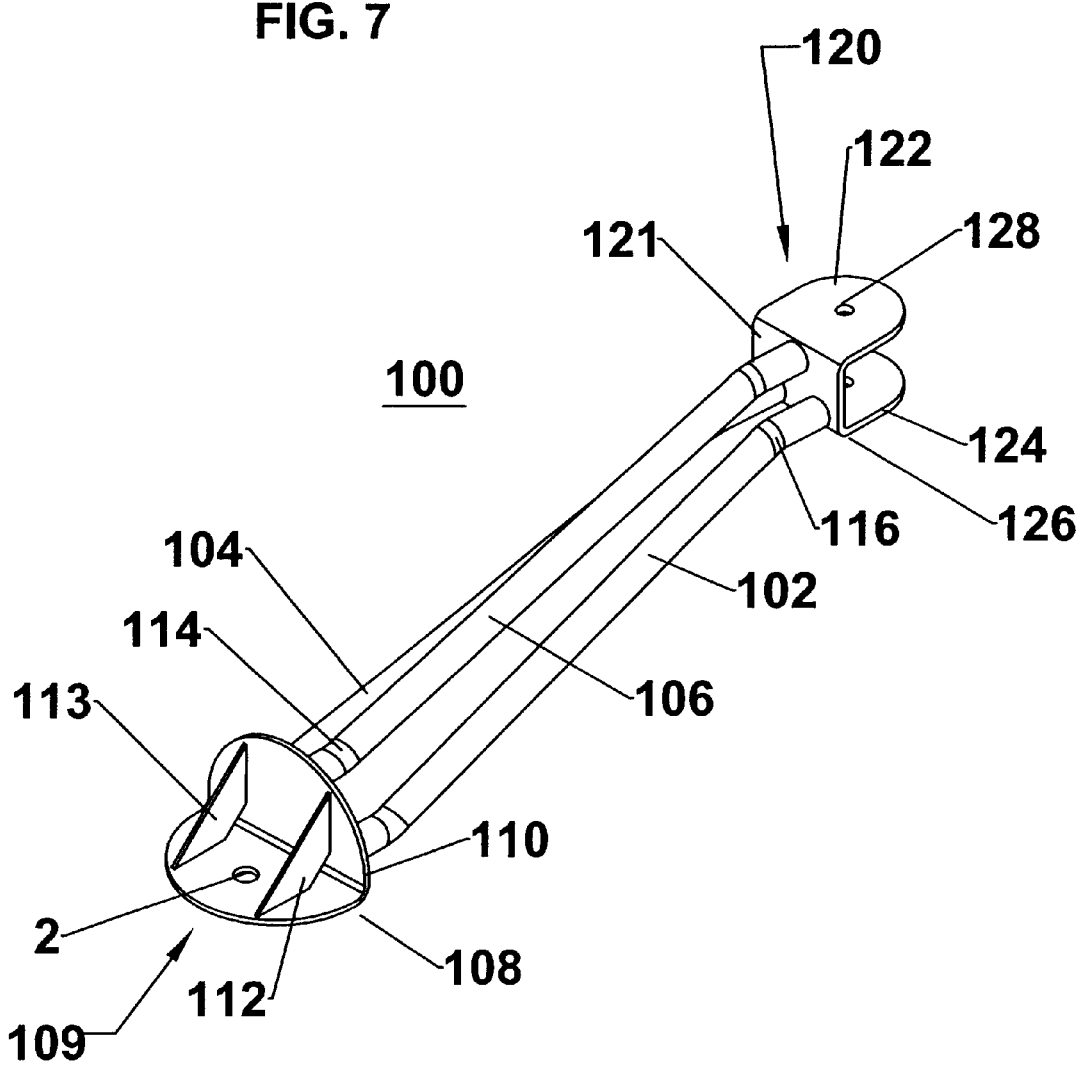
FIG. 7 perspectively illustrates a supporting structure for the mirror assembly of FIG. 1.
Figure 8:
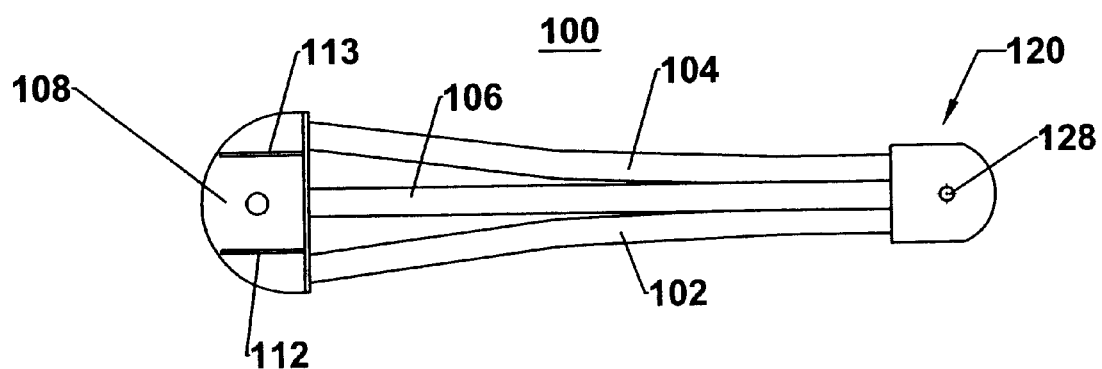
FIG. 8 is a top view of the supporting structure of FIG. 7.
Figure 9:
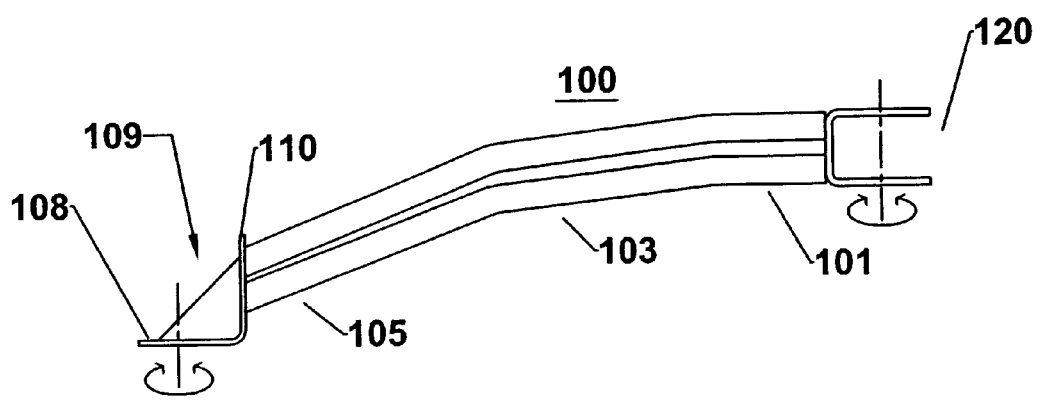
FIG. 9 i a side view of the supporting structure of FIG. 7.

In accordance with the present invention, the mirror assembly 1 of FIG. 1 is connected by a pin (not shown) which passes through a through hole 2 (FIG. 7) located at one end of the supporting structure 100. The other end of the structure 100 is pivotally connected to the vehicle in a manner which is of secondary relevance here and the details of which can be discerned later herein as well as from previously filed patent applications of the assignee of the present information, the contents of which have been incorporated herein by reference as identified in detail further on herein.

Referring to FIG. 1, the mirror assembly 1 of the present invention includes a shell housing 10, and a plurality of mirror units (preferably three mirror units) 16, 18, 19 coupled to the mirror assembly 1. Each of the mirror units 16, 18 and 19 are preferably separately adjustably coupled to the mirror assembly 1.

Preferably, mirror unit 18 includes a convex mirror 80, mirror unit 16 includes a flat mirror 60, and mirror unit 19 includes a convex mirror 82. Most preferably, convex mirror unit 18 is mounted above flat mirror unit 16. It is preferred that mirror unit 19 provide a cross:view function, while mirror units 16 and 18 provide side view functions.

Advantageously, although the mirror assembly 1 includes two convex mirrors (80 and 82), the fact that they are spaced apart from one another by flat mirror unit 16 mitigates against confusion as to what the driver is viewing.

Details on how the mirror units are coupled to the mirror assembly 1 may be found in pending applications Ser. No. 09/216,124, filed Dec. 18, 1998; Ser. No. 08/989,800, filed Dec. 12, 1997 now U.S. Pat. No. 6,059,419; and Ser. No. 08/799,251, filed Feb. 14, 1997 now U.S. Pat. No. 5,889,627, all of which are entitled SINGLE SHELL, DOUBLE VIEW VEHICULAR MIRROR HAVING MANUAL ADJUSTABILITY AND PRECISION HINGE PLATE, and the entire disclosures of which are hereby incorporated by reference. Additional details on how the mirror units are coupled to the mirror assembly 1 may be found in pending application Ser. No. 08/711,810, filed Sep. 10, 1996 and now abandoned, entitled SINGLE SHELL DOUBLE VIEW MIRROR FOR VEHICLES, the entire disclosure of which is hereby incorporated by reference.

Figure 2:
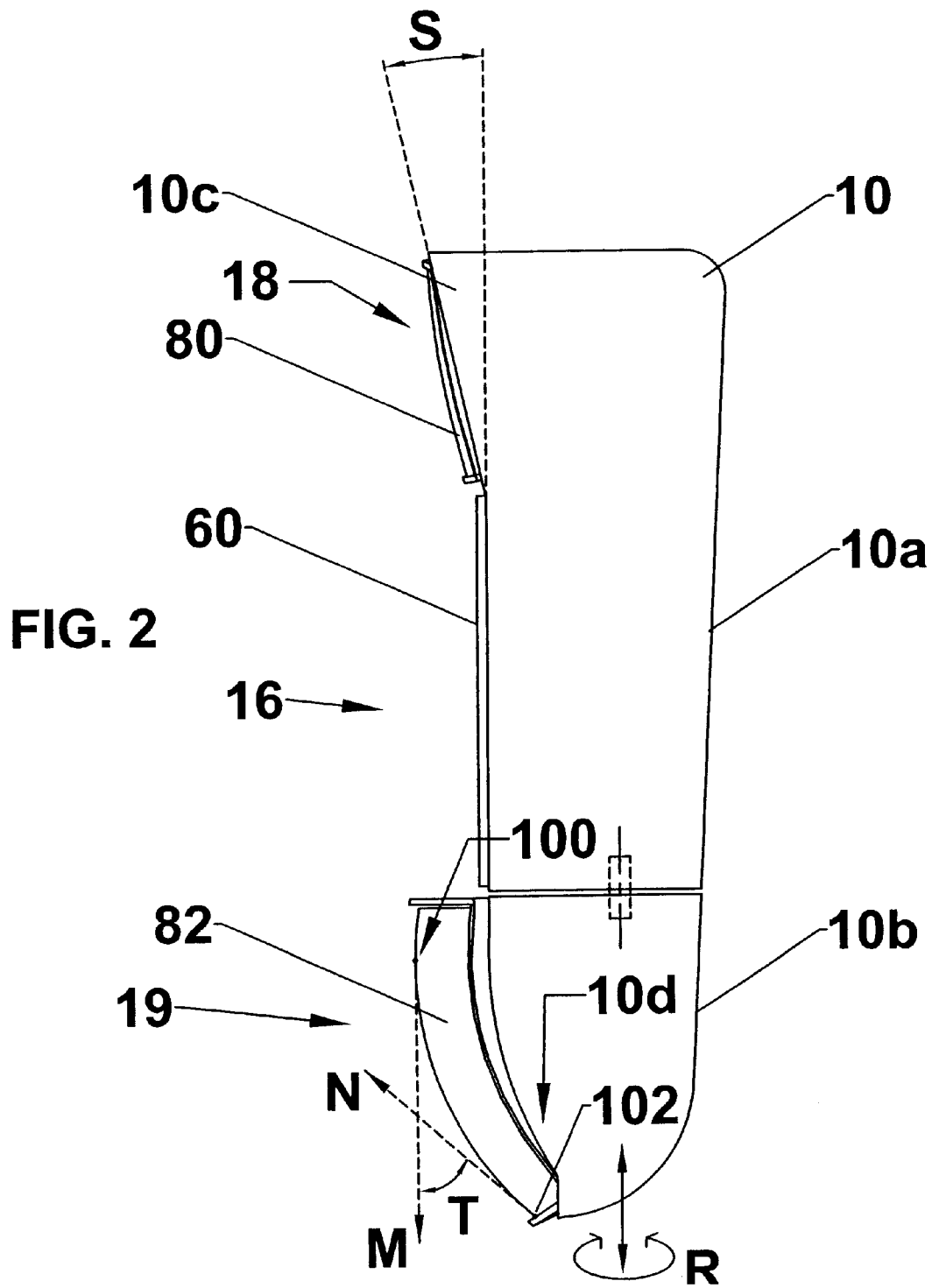
FIG. 2 is a side view of the mirror assembly of the present invention.

As best seen in FIG. 2, mirror assembly 18 is downwardly biased at a fixed angle S with respect to a vertical axis defined, for example, by the shell housing 10. Preferably S is grater than zero and between about zero and 25° from the vertical. It is preferred that S is between about 19° and 23° and it is most preferred that S be about 22°. Shell housing 10 includes a shroud portion 10c which is sized and shaped to substantially cover mirror unit 18.

It is understood that mirror 80 may be further biased downward or directed upward with respect to the vertical axis by way of the adjustable mounting of mirror unit 18 with respect to shell housing 10.

Advantageously, the downward bias S of mirror 80 ensures superior rear views of the vehicle, particularly a rear axle portion of the vehicle and much of the area at the side of the vehicle (where children who may be walking proximate to the vehicle will be seen).

Referring again to FIGS. 1 and 2, the shell housing 10 preferably includes two sections 10a and 10b. Section 10a at least partially receives mirror units 16 and 18 and section 10b at least partially receives mirror unit 19. Shell housing section 10b is preferably rotatably coupled with respect to shell housing section 10a such that section 10b may be rotated in the direction of the arrow R. In this configuration, mirror unit 19 may be oriented in directions transverse to the directions of mirror units 16 and 18 by rotating section 10b instead of moving mirror unit 19 with respect to the shell housing 10b.

Advantageously, the rotatable feature of shell housing 10 and mirror unit 19 ensures superior cross views of the front area of the vehicle. It is understood that mirror 82 may be further biased from side to side with respect to the shell housing 10 (or 10b) by way of the adjustable. mounting of mirror unit 19 with respect to shell housing 10.

It is noted that shell housing 10 may include only one section (i.e., there being no section 10b rotatable with respect to 10a) where mirror units 16, 18 and 19 are all at least partially received in one integral shell housing 10.

Mirror unit 19 is preferably adapted to receive a radically convex mirror 82. In particular, it is preferred that convex mirror 82 include a radius of curvature of about 6 to 8 inches.

Put another way, the degree to which mirror 82 is convex may be defined as follows: (i) an upper surface portion 100 of mirror 82 defines a tangential axis M; (ii) a lower surface portion 102 of mirror 82 defines a tangential axis N; (iii) axes M and N are transverse with respect to one another such that they define angle T; and (iv) angle T is between about 30° to 60° and is preferably about 45°. It is noted that axis M is preferably substantially vertical when the mirror assembly 1 is coupled to a vehicle such that an axis normal to area 102 of mirror 82 points substantially at the ground near the vehicle.

Shell housing 10 includes a cut away portion 10d (FIG. 2) near the bottom to accommodate the radically curved convex mirror 82.

Advantageously, the radical convex surface of mirror 82 provides improved cross views of a front portion of the vehicle (where children may be walking aproximate to the vehicle).

Figure 3:
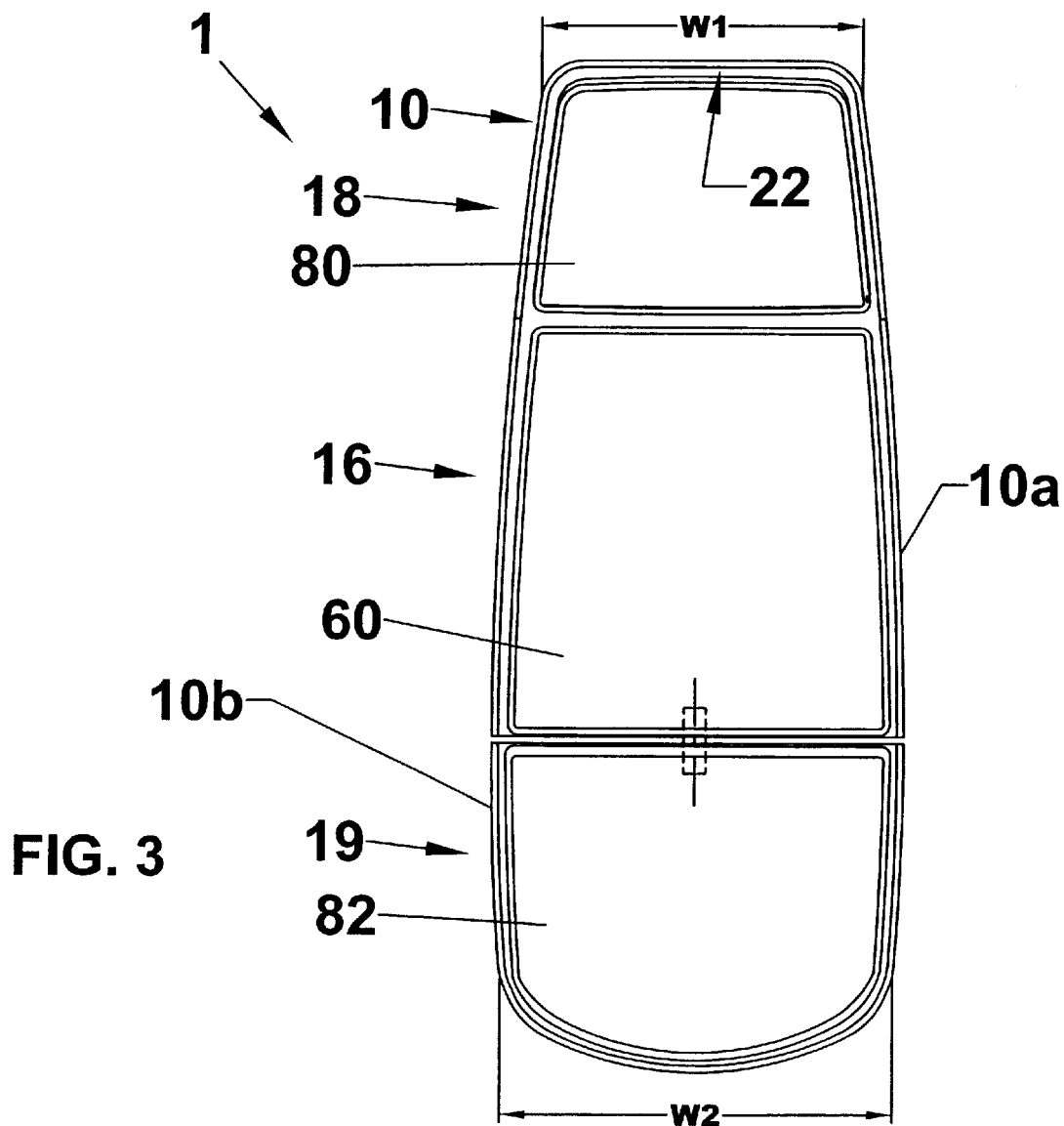
FIG. 3 is a front-view of the mirror assembly of the present invention.

Reference is now made to FIG. 3 which shows a front elevation of the mirror assembly 1 of the present invention. Preferably, the shell housing 10, mirror unit 18, and mirror 80 may be individually and collectively described as having width(s) W1 proximate to a top portion of the mirror assembly 1. Similarly, the shell housing 10, mirror unit 19, and mirror 82 may be individually and collectively described as having width(s) W2 proximate to a bottom portion of the mirror assembly 1. It is preferred that W1 be less than W2 such that the mirror assembly 1 is substantially pear-shaped. It is preferred that W1 be between about 85% and 90% of W2 and it is most preferred that W1 be about 87% of W2.

Advantageously, the pear shape of the mirror assembly 1 of the present invention provides improved cross views of the front portion of the vehicle.

Figure 4:
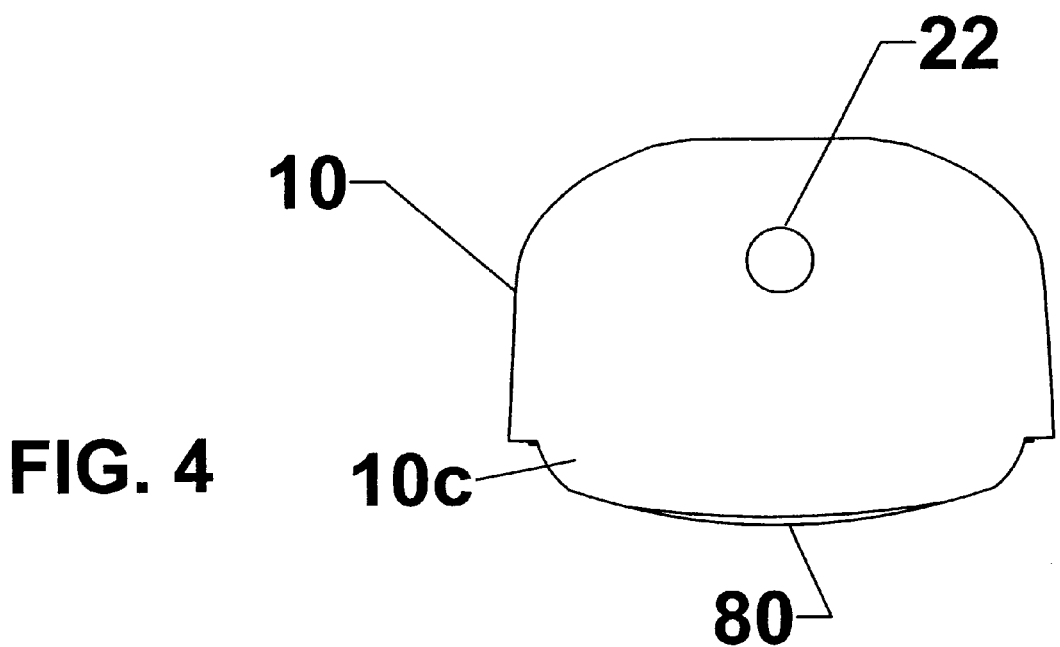
FIG. 4 is a top-view of the mirror assembly of the present invention.
Figure 5:
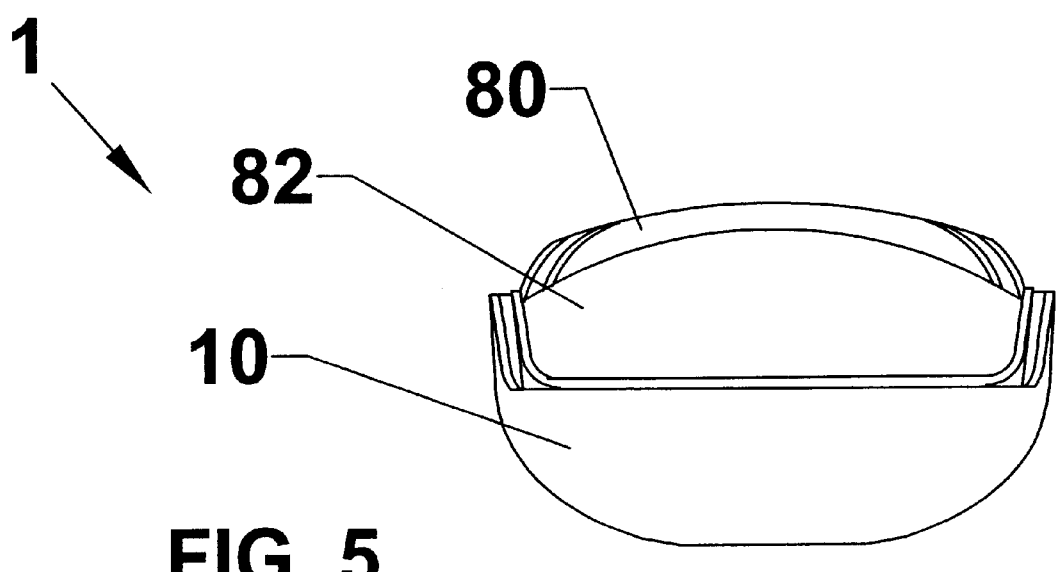
FIG. 5 is a bottom view; of the mirror assembly of the present invention.

FIGS. 4 and 5 show a top view and a bottom view, respectively, of the mirror assembly 1 according to the present invention. As best seen in FIGS. 3 and 4, mirror assembly 1 includes a mounting aperture 22 into which a mounting pole (not shown) is received. The mounting pole is provided to couple the mirror assembly 1 to a vehicle. Details of preferred embodiments of how the mirror assembly 1, mounting aperture 22, mounting pole, and vehicle interrelate to mount the mirror assembly 1 to the vehicle are provided later on herein. However, alternative mounting hardware. is found in the aforementioned patent applications, (Ser. No. 09/216,124, Ser. No. 08/989,800, Ser. No. 08/799,251, and Ser. No. 08/711,810.

It is most preferred that the mirror assembly 1 of the present invention be employed with busses having substantially flat front profiles (i.e., busses where the hoods do not project substantially forward of the windshield). In particular, it is preferred that the mirror assembly be overhang mounted (i.e., where the mounting pole enters the shell housing 10 from the top) and that the assembly 1 be disposed just forward of the face of the bus. This ensures that both cross views and rear views may be obtained via the same mirror assembly 1.

Figure 6:
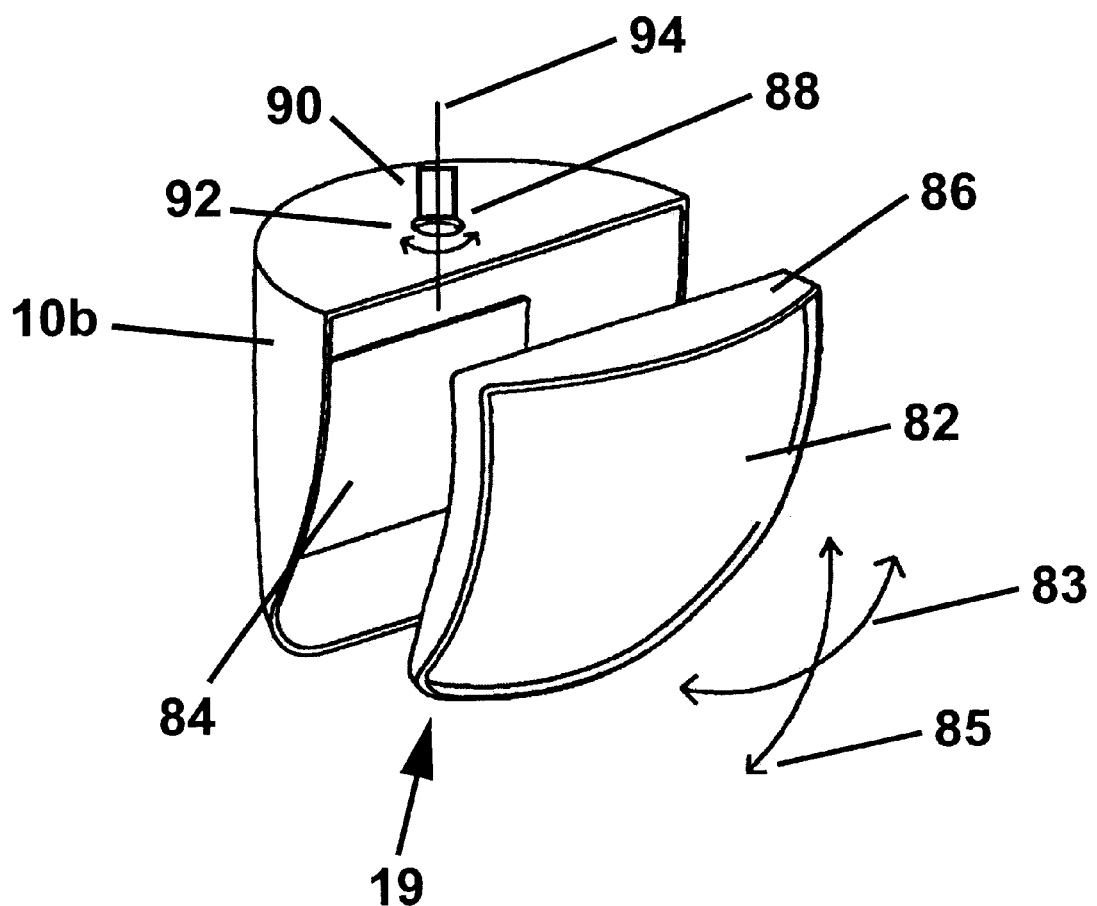
FIG. 6 is a perspective of the shell housing section which supports the cross view mirror.

Turning to FIG. 6, section 10b of the shell housing 10 supports the cross view mirror assembly 19 which is mounted on a universally pivotable plate 84 the mounting construction of which can be discerned from any of the disclosures which have been incorporated by reference herein. The rear panel (not shown) of the casing 86 of the cross view mirror 19 is attached to the mounting plate 84, so that the mirror 82 can be pivoted in all directions including horizontally as shown by arrow 83 and vertically as shown by arrow 85, relative to the shell housing section 10b.

The shell housing section 10b is itself rotatable relative to the section 10a on account of its being mounted by a pin 90 which passes through a hole 88 which engages a bottom surface (not shown) of the section 10a. This mode of connection allows the section 10b to rotate about vertical axis 94. If desired, several embossments 92 spaced circumferentially around the hole 88 interact with corresponding depressions (not shown) in section 10a, thereby allowing a driver to rapidly select any of several pre-set locations of the mirror assembly 19.

In the prior applications of the assignee of the present invention (that have been incorporated by reference herein) there is described a supporting arm or structure which includes one end which is connected by a pivot to a vehicle and another end which supports a mirror assembly. Referring to FIGS. 7–11 herein, there is now described another construction of such mirror assembly supporting structure 100. The supporting structure 100 includes at a vehicle side thereof a U-shaped end bracket 120 which includes a top plate 122, a bottom plate 124 and aligned through holes 128 that are sized to receive the aforementioned pivot by which the structure 100 is rotatably or swingingly connected to the vehicle (not shown). Bracket 120 also comprises a vertical panel 121 extending between the plates 122 and 124 and rigidly supporting three generally horizontally extending tubular arms or tubes 102, 104 and 106. The arms 102 and 104 are in a first plane and the arm 106 extends along a line which is spaced from and extends above the plane of the arms 102 and 104. Each of the three tubes has a first, generally horizontal section 101 adjacent the end bracket 120, a downward slanting, center section 103 and a third section 105 which again extends generally horizontally and engages the mirror-side end bracket 109. The bracket 109 is generally L-shaped and comprises a horizontal plate 108 which extends at a right angle to a vertical plate 110, the plates 108 and 109 being structurally reinforced against bending by triangular reinforcing plates 112 and 113. The through hole 2 (FIG. 7) accommodates a pin or bolt or other connecting structure by which the mirror assembly 1 (FIG. 1) is suspended from the mirror assembly supporting structure 100.

Figure 10:
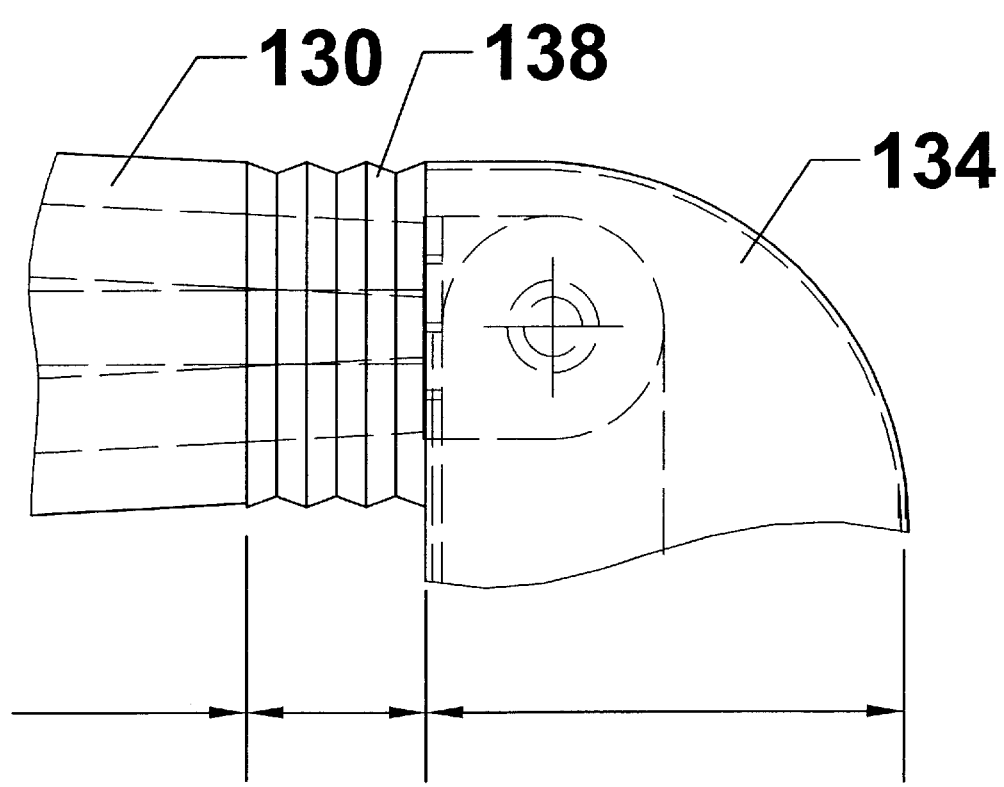
FIGS. 10 and 11 show portions of an esthetic and aerodynamically constructed sleeve including bellows portions for the supporting structure of FIG. 7.
Figure 11:
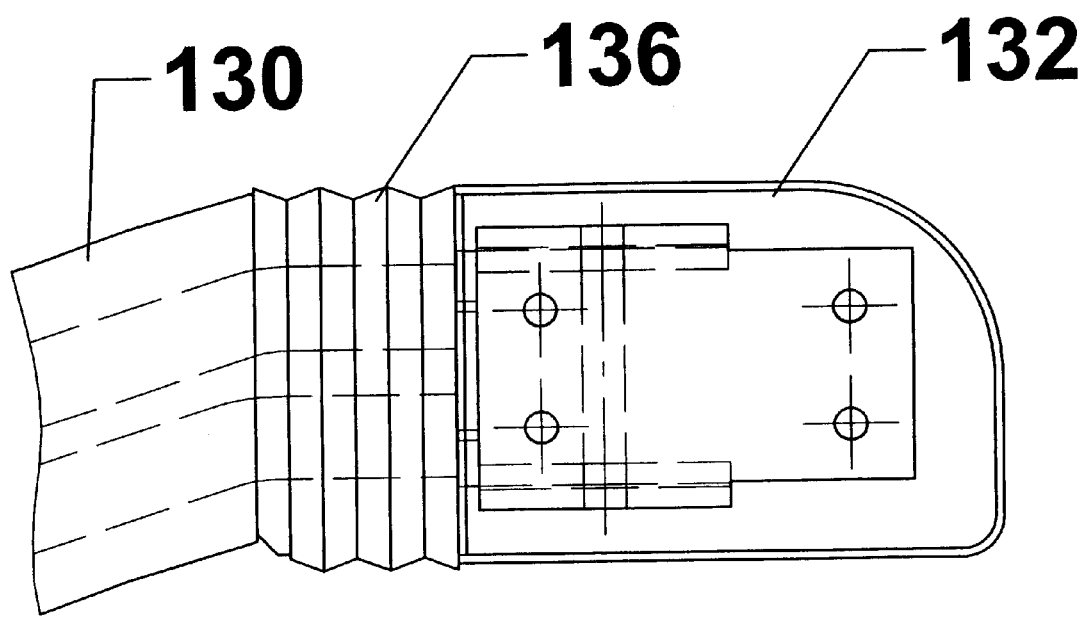

For esthetic, aerodynamic and other considerations the entire support structure 100 is covered by a shroud or sleeve 130 (FIGS. 10 and 11). Furthermore, the portions around the end brackets 120 and 109 include shrouds 132 and 134 and corresponding boots or bellows 136 and 138 which accommodate expansion and/or contraction of the structure 100 during bending, pivoting, etc. thereof.

Note that, as shown in FIG. 3, the mirror unit 19 is connected to a metal plate 84, which constitutes a portion of the mounting hardware for the mirrors. Similar plates are provided in section 10a of the shell housing and all the metal parts are interconnected to one another and to the supporting structure 100. Thereby, the mirrors 18, 19, and 20 are vibrationally isolated from the shell housing which is exposed to wind forces and the like.

In accordance with one aspect thereof, the present invention discloses the concept of providing three separate mirrors on one supporting structure. These mirrors include a first somewhat convex mirror and a second flat mirror for serving as side view mirrors. The third mirror. is a highly convex mirror, constituting a cross-over mirror. In line with this basic concept of the present invention, reference is now made to FIGS. 12A, 12B, 12C and 12D, which are, respectively, a perspective, a rear view, a side view, and a front view of an assembly of such mirrors. In FIG. 12A are shown the slightly convex mirror 18', the flat mirror 16' and the cross-over mirror 19'. The functions of these mirrors are the same as for the previously described mirrors 18, 16 and 19 and all of the features described relative thereto including orientation and purpose should be imputed to and apply to these mirrors. In FIG. 12A, the three mirrors 18', 16' and 19' are mounted on the vertical portion 160 of a supporting structure 150 that has side arms 152 and 154. The flattened brackets 156 and 158 which are attached, respectively, to the arms 152 and 154 serve to connect the supporting structure 150 to a vehicle such as a school bus, in a well known manner.

As shown in FIG. 12B, the two side view mirrors 18' and 16' have mirror backs with channels 180 for receiving the vertical member 160 of the supporting structure 150 which is held in place by a sleeve 182, as shown. Therefore, the mirrors 18' and 16' can be rotated sideways for purposes of adjustability.

The highly convex mirror 19' is connected by a swivel mechanism 178 which allows the three-dimensional adjusting thereof. It should be noted that the present invention also contemplates that the mirror 18' and 16' may also be connected to the vertical member 160 by a three-dimensional swivel mechanism.

Turning now to FIGS. 13A, 13B, 13C and 13D, it should be evident at a glance that the difference lies in the employment of the supporting structure 170 which comprises a vertical bar 174 and a horizontal, multi-tube portion 172 by which the supporting structure 170 is connected to a vehicle. While the multi-tube connection is shown consisting of two tubular members, more (or less) than two tubes may be used. In the embodiments of FIGS. 13A–13D, the convex, cross-over mirror 19' is supported by a swivel mechanism 178 which is attached by a bracket 176 to the lowermost tip of the vertical member 174.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror assembly for vehicles, comprising:
   an integrated mirror supporting unit including a shell housing and supporting therein a plurality of mirror elements including at least one rear view mirror and a convex cross view mirror and mounting hardware for mounting said at least one rear view mirror and said convex cross view mirror to said mirror supporting unit; and
   a mirror assembly supporting structure having a first end engaged with said mirror supporting unit and a second end engaged to and coupled with a vehicle body, in a manner that supports the convex cross view mirror forward of a front-most portion of the vehicle, including first and second rear view mirrors and a single said convex cross view mirror and each of said mirrors being independently adjustable relative to said shell housing of said mirror supporting unit.

2. The mirror assembly of claim 1, in which the shell housing comprises a first section and a second section for accommodating therein, respectively, said at least one rear view mirror and said cross view mirror.

3. The mirror assembly of: claim 2, in which the cross view mirror is capable of being positioned by said mirror assembly supporting structure to afford a view forward and in front of said vehicle body.

4. The mirror assembly of claim 2, in which the second shell housing section is rotatable relative to the first shell housing section.

5. The mirror assembly of claim 2, further including a detent mechanism disposed between the first shell housing section and the second shell housing section.

6. The mirror assembly of claim 1, in which the mirror supporting unit comprises a metal frame connected directly to the mirror assembly supporting structure and said mirrors being structurally engaged with said frame and vibrationally isolated from said shell housing.

7. The mirror assembly of claim 1, in which the first rear view mirror is a convex mirror and the second rear view mirror is a flat mirror.

8. The mirror assembly of claim 7, in which the cross view mirror is substantially more convex then the convex rear view mirror and the rear view mirrors and the cross view mirrors are vertically aligned with the flat mirror being-positioned above the cross view mirror.

9. The mirror assembly of claim 7, in which the mirror supporting unit is vertically suspended from the mirror assembly supporting structure and is rotatable about a vertically extending axis of rotation.

10. The mirror assembly of claim 9, in which the convex rear view mirror is inclined away from said axis rotation at an angle of between about 0° and 25°.

11. The mirror assembly of claim 9, in which the cross view mirror is convex to a degree defined by a tangential axis M which extends from an upper surface portion of the convex cross view mirror, a tangential axis N which extends from a lower surface portion of the convex cross view mirror, the axes M and N being transverse with respect to one another such that the define an angle T, and T is between about 30° to 60°.

12. The mirror assembly: of claim 1, in which the shell housing is substantially pear shaped.

13. The mirror assembly of claim 1, in which the mirror assembly supporting structure comprises a first bracket for coupling of the mirror assembly supporting structure to the vehicle body, a second bracket for coupling the mirror supporting unit to the mirror assembly supporting structure and a center portion extending therebetween.

14. The mirror assembly of claim 13, in which the center portion comprises three longitudinally extending tubes.

15. The mirror assembly of claim 14, in which two of the three tubes lie in a first plane and the third tube extends above said first plane.

16. The mirror assembly of claim 13, further including a shroud enclosing and defining aerodynamic features of the mirror assembly supporting structure.

17. The mirror assembly of claim 16, in which the shroud includes a respective boot disposed adjacent and around the first and second brackets to accommodate movements of the mirror assembly supporting structure.

18. The mirror assembly of claim 1, in which the vehicle is a school bus.

19. The mirror assembly of claim 1, in which the first rear view mirror is pre-cantered.

* * * * *